Sept. 14, 1948.  L. R. LUDWIG ET AL  2,449,494
FAN-COOLED DYNAMOELECTRIC MACHINE
Filed Aug. 30, 1946

WITNESSES:
Edward M. Michaels
Thu. C. Groome

INVENTORS
Leon R. Ludwig, Theodore C. Fockler,
William H. Formhals & Howard T. Walton.
BY O. B. Buchanan
ATTORNEY Patented Sept. 14, 1948

2,449,494

UNITED STATES PATENT OFFICE 2,449,494

FAN-COOLED DYNAMOELECTRIC MACHINE

Leon R. Ludwig, Theodore C. Fockler, and William H. Formhals, Buffalo, N. Y., and Howard T. Walton, Pittsburgh, Pa., assignors to Westinghouse Electric Corporation, East Pittsburgh, Pa., a corporation of Pennsylvania Application August 30, 1946, Serial No. 694,064

7 Claims. (Cl. 171—252)

Our invention relates to fan-cooled motors or generators, and it has particular relation to dynamo-electric machines having stator-members which are readily convertible and usable as the stator-members of protected or open machines, in a conversion-manner similar to that which is described and claimed in our copending application, Serial No. 690,628, filed August 15, 1946.

In order for a motor to be convertible from an open to an enclosed motor, or from a protected motor to a fan-cooled motor, it is highly desirable for the same stator member to be used for both types of machine, with as little conversion-trouble as possible. Since the stator member necessarily has leads, and since those leads must come out of the stator-frame whether the machine is open or closed, that is, whether it has open or closed end-brackets, it is necessary for the leads to come out of a hole or opening in the stator frame-ring, rather than through a hole in an end-bracket which would be a different end-bracket according as the machine was open or closed at its ends.

The principal object of our invention is to provide a dynamo-electric machine having a stator-construction which is basically utilizable as the stator of an open or protected dynamo-electric machine, and having a bulged imperforate end-bracket, cooperating with complementarily notched end-plate and stator-laminations, permitting the stator-leads to pass out under the bulge in the bracket, and thence through the opening provided by the complementary notches, to the space outside of the outer periphery of the stator-core laminations, and thence out through the hole in the frame-ring. When the hole between the complementary notches is plugged by a suitable sealing-means, the machine is completely enclosed by its end-brackets. When the machine is to be provided with open end-brackets, the bulged imperforate bracket would not be used, and the hole-plugging sealing-means may also be omitted, thus providing for ready convertibility.

Figure 1:
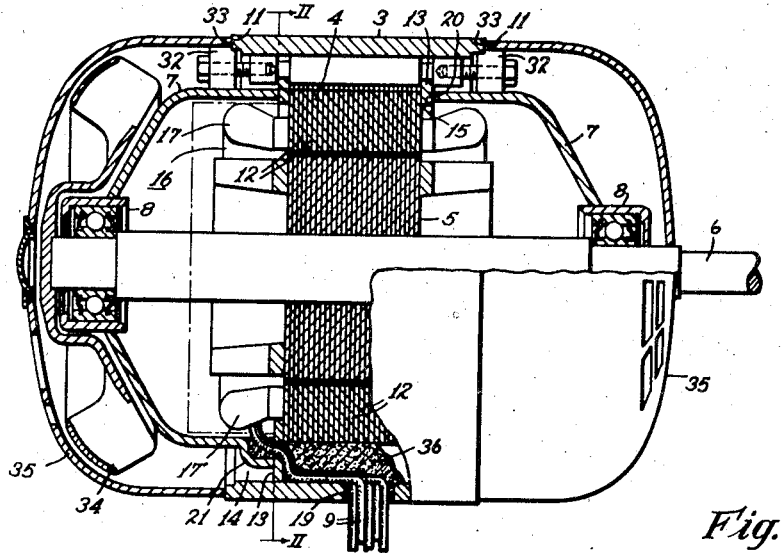
Figure 3:
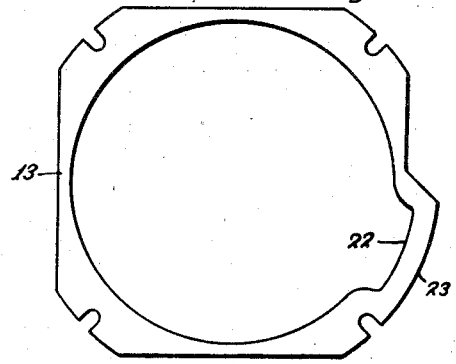
Figure 2:
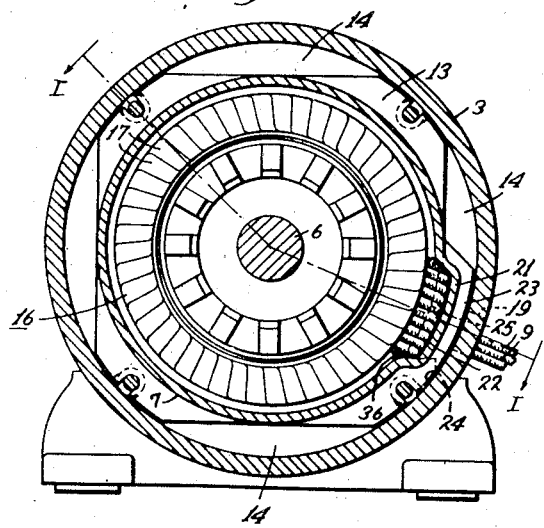
Figure 4:
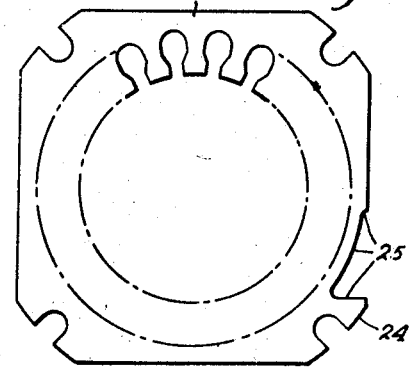

With the foregoing and other objects in view, our invention consists in the machines, apparatus, combinations, parts and methods hereinafter described and claimed, and illustrated in the accompanying drawing, wherein:

Fig. 1 is a longitudinal sectional view of a fan-cooled squirrel-cage induction-motor embodying our invention, the section-plane being approximately indicated by the broken line I—I in Fig. 2, Fig. 2 is a transverse sectional view of the same motor, on the section-plane II—II of Fig. 1, and Figs. 3 and 4 are plan views of the stator-punching and the end-plate, respectively.

The drawing shows a totally enclosed dynamo-electric machine comprising a strong, rigid frame-ring 3, a stator-core member 4, a rotor-core member 5, a shaft 6, two imperforate end-brackets 7 having bearings 8 supporting the shaft, and stator-leads 9. The frame-ring 3 has an accurate radial-register surface 11 at each end thereof. The stator-core member 4 comprises a rigidly held stack of stator-punchings or laminations 12, with an end-plate 13 at each end. At a plurality of points around the stator-core stack, the stator-laminations and end-plates fit within the inside of the frame-ring 3, and said stator-laminations and end-plates are spaced, at other peripheral points, from the inside of the frame-ring, thus providing axial ventilating-spaces 14, running the length of the stator-core, between portions of the outer periphery of the stator-laminations and the inside of the frame-ring. The two end-plates 13 are secured within the frame-ring 3 near the respective ends thereof. The end of each end-plate has an accurate, continuous, axial-register surface 15.

The stator-core 4 carries a stator-winding 16, having end-turns 17 at each end. The stator-leads 9, which may be six or more in number, extend from the end-turns 17 at one end of the machine, and pass out of the machine through a hole 19 in the frame-ring 3.

In accordance with our invention, the imperforate brackets 7 each have a peripheral part having a continuous axial-register surface 20 which is pressed against the axial-register surface 15 of the end-plate 13 at that end of the machine, and at least one of the imperforate brackets 7, namely the one at the end of the machine where the leads 9 leave the end-turns 17, has its peripheral part bulged outwardly over the leads, this peripheral bulge being shown at 21. The inner periphery of the adjacent end-plate 13 is notched outwardly at the same place, as shown at 22, and this notch 22 in the end-plate comes under a place where the end-plate makes one of its fits within the inside of the frame-ring 3. This particular frame-ring-fitting part of the end-plate 13, at the lead-end of the machine, is shown at 23; and as shown in Figs. 2 and 3, it extends over the notch 22, and it also extends around further circumferentially, within the frame-ring, than the corresponding frame-ring-fitting part 24 of the stator-core punchings 12, as shown in Figs. 2 and 4. At least those punchings or laminations 12, which are closest to the notched end-plate 13 at the lead-end of the machine, are inwardly notched, in their outer periphery, at the place 25 corresponding to the notch 22 in the inner periphery of the end-plate 13, so that the notches 22 and 25 are complementary to each other, providing, between them, a hole through which the leads 9 can pass, under the bracket-bulge 21, from the end-turns 17 to one of the ventilating-spaces 14 between the outer periphery of the punchings and the inner periphery of the frame-ring, whence the leads pass out of the machine through the hole 19 in the frame-ring.

For the sake of symmetry, and in order to utilize as many identical parts as possible, we prefer to make both of the brackets 7 alike, both of the end-plates 13 alike, and all of the punchings 12 alike. Since the brackets 7 are imperforate, they have no air-holes therein. The brackets 7 preferably have no radial register with their respective end-plates 13, but the brackets are provided with a plurality of peripheral lugs 32 having radial-register surfaces 33 having an intermittent radial register with the radial-register surface at that end of the frame-ring 3, thus accurately centering and aligning the bearings 7, while maintaining the axial ventilating-spaces 14 for external air-ventilation over the stator-laminations 12, over the imperforate brackets 7, and over the bearings 8. This external air-ventilation may be maintained by means of a fan 34 surrounding one of the brackets 7, and two spaced end-hoods 35, one surrounding each bracket 7, in spaced relation thereto.

In operation, our imperforate end-brackets 7 are each pressed tightly, (and hence substantially air-tightly), against the accurate axial-register surface 15 of the end-plate 13 at that end of the machine. At the lead-end, the peripheral bulge 21 in the imperforate end-bracket fits over the leads 9 and encloses this portion of the leads in a substantially air-tight enclosure within the machine. At the place where the leads 9 pass under the notch 22 in the end-plate 13, and out over the complementary notch 25 in the outer periphery of the laminations 12, the space is plugged by a sealing-means 36; and if the other end-plate 13, at the other end of the machine, is similarly notched, its notch 22 is similarly plugged by sealing-means 36.

When the stator-member is to be used as a part of an open machine, instead of an enclosed machine, the imperforate brackets 7 are not used, being replaced by other end-brackets (not shown), which have ventilating-openings therein; and the sealing-means 36 is not needed. Our invention thus solves a difficult lead-bringing-out problem, in a stator member which is utilizable for both open and enclosed machines.

While we have illustrated and described our invention in only one illustrative form of embodiment, we wish it to be understood that we are not altogether limited to this one form of design, and we desire, therefore, that the appended claims shall be accorded the broadest construction consistent with their language.

We claim:

1. A totally enclosed dynamo-electric machine comprising a frame-ring, an end-plate secured within the inner periphery of the frame-ring near each end of the frame-ring, a stator-core member secured between the two end-plates, at least a portion of the outer periphery of the stator-core being radially spaced from the inner periphery of the frame-ring, the end-plates having air-vents therethrough, admitting of an axial air-flow over the stator-core from one end of the core to the other, a stator-winding carried by the stator-core, said stator-winding having end-turns, a plurality of leads extending from the end-turns at one end of the stator-winding, said frame-ring having a hole through which said leads pass, a shaft, a rotor-core member carried by the shaft, two imperforate brackets removably mounted on the machine, one at each end, each imperforate bracket having no air-hole therein, and having a bearing for supporting the shaft at that end of the machine, and further having a plurality of peripheral lugs having an intermittent radial register with that end of the frame-ring, and further having a peripheral part having a continuous axial register with the end of the end-plate at that end of the machine, the peripheral part being bulged outwardly at the place where the leads leave the end-turns, and the inner periphery of the adjacent end-plate being notched outwardly at the same place, to permit the leads to pass from the end-turns to the space surrounding the periphery of the stator-core and thence out through the hole in the frame-ring, and sealing the place where the end-plate is notched.

2. A totally enclosed dynamo-electric machine comprising a strong, rigid frame-ring having an accurate radial-register surface at each end thereof, a stator-core comprising a rigidly held stack of stator-laminations with an end-plate at each end, said stack, including end-plates and stator-laminations, fitting, at a plurality of spaced points about the outer periphery of the stator-core, within the inside of the frame-ring, the end-plates and stator-laminations being spaced from the inside of the frame-ring at other peripheral points, the end of each end-plate having an accurate, continuous, axial-register surface, a stator-winding carried by the stator-laminations, said stator-winding having end-turns, a plurality of leads extending from the end-turns at one end of the stator-winding, said frame-ring having a hole through which said leads pass, two imperforate brackets removably mounted on the machine, one at each end, each imperforate bracket having no ventilating-hole therein and having no radial register with the end-plate at that end of the stator-core but having a plurality of peripheral lugs having radial-register surfaces having an intermittent radial register with the radial-register surface at that end of the frame-ring, bearings carried by said imperforate brackets, a rotor-member having a shaft which is supported by said bearings, each imperforate bracket having a peripheral part having an axial-register surface having a continuous axial register with the axial-register surface of the end-plate at that end of the stator-core, the periphral part being bulged outwardly at the place where the leads leave the end-turns, and the inner periphery of the adjacent end-plate being notched outwardly at the same place, to permit the leads to pass from the end-turns to the space surrounding the periphery of the stator-laminations and thence out through the hole in the frame-ring, and sealing-means for sealing the place where the leads pass from the notch in the end-plate to the outer periphery of the stack of stator-laminations.

3. A totally enclosed dynamo-electric machine comprising a strong, rigid frame-ring having an accurate radial-register surface at each end thereof, a stator-core comprising a rigidly held stack of stator-laminations with an end-plate at each end, said stack, including end-plates and stator-laminations, fitting, at a plurality of spaced points about the outer periphery of the stator-core, within the inside of the frame-ring, the end-plates and stator-laminations being spaced from the inside of the frame-ring at other peripheral points, at least one of the end-plates having a frame-ring-fitting part which extends around further circumferentially than the corresponding frame-ring-fitting part of the stator-laminations, the inner periphery of said end-plate being notched outwardly underneath said extended portion of the frame-ring-fitting part, the end of each end-plate having an accurate, continuous, axial-register surface, a stator-winding carried by the stator-laminations, said stator-winding having end-turns, a plurality of leads extending from the end-turns at the same end as said notched end-plate, said frame-ring having a hole through which said leads pass, two imperforate brackets removably mounted on the machine, one at each end, each imperforate bracket having no ventilating-hole therein and having a plurality of peripheral lugs having radial-register surfaces having an intermittent radial register with the radial-register surface at that end of the frame-ring, bearings carried by said imperforate brackets, a rotor-member having a shaft which is supported by said bearings, each imperforate bracket having a peripheral part having an axial-register surface having a continuous axial register with the axial-register surface of the end-plate at that end of the stator-core, the peripheral part being bulged outwardly over the notch of the notched end-plate, to permit the leads to pass from the end-turns to the space surrounding the periphery of the stator-laminations and thence out through the hole in the frame-ring, and sealing-means for sealing the place where the leads pass from the notch in the end-plate to the outer periphery of the stack of stator-laminations.

4. A totally enclosed dynamo-electric machine comprising a strong, rigid frame-ring having an accurate radial-register surface at each end thereof, a stator-core comprising a rigidly held stack of stator-laminations with an end-plate at each end, said stack, including end-plates and stator-laminations, fitting, at a plurality of spaced points about the outer periphery of the stator-core, within the inside of the frame-ring, the end-plates and stator-laminations being spaced from the inside of the frame-ring at other peripheral points, at least one of the end-plates having a frame-ring-fitting part which extends around further circumferentially than the corresponding frame-ring-fitting part of the stator-laminations, the inner periphery of said end-plate being notched outwardly underneath said extended portion of the frame-ring-fitting part, the outer periphery of at least the adjacent stator-laminations being notched at the place corresponding to the notch in the inner periphery of the notched end-plate, the end of each end-plate having an accurate, continuous, axial-register surface, a stator-winding carried by the stator-laminations, said stator-winding having end-turns, a plurality of leads extending from the end-turns at the same end as said notched end-plate, said frame-ring having a hole through which said leads pass, two imperforate brackets removably mounted on the machine, one at each end, each imperforate bracket having no ventilating-hole therein and having a plurality of peripheral lugs having radial-register surfaces having an intermittent radial register with the radial-register surface at that end of the frame-ring, bearings carried by said imperforate brackets, a rotor-member having a shaft which is supported by said bearings, each imperforate bracket having a peripheral part having an axial-register surface having a continuous axial register with the axial-register surface of the end-plate at that end of the stator-core, the peripheral part being bulged outwardly over the notch of the notched end-plate, to permit the leads to pass from the end-turns to the space surrounding the periphery of the stator-laminations and thence out through the hole in the frame-ring, and sealing-means for sealing the place where the leads pass from the notch in the end-plate to the notch in the stator-laminations.

5. A dynamo-electric machine comprising a frame-ring, an end-plate secured within the inner periphery of the frame-ring near each end of the frame-ring, a stator-core member secured between the two end-plates, at least a portion of the outer periphery of the stator-core being radially spaced from the inner periphery of the frame-ring, the end-plates having air-vents therethrough, admitting of an axial air-flow over the stator-core from one end of the core to the other, a stator-winding carried by the stator-core, said stator-winding having end-turns, a plurality of leads extending from the end-turns at one end of the stator-winding, said frame-ring having a hole through which said leads pass, a shaft, and a rotor-core member carried by the shaft, the inner periphery of the end-plate, at the end where the leads extend from the end-turns, being notched outwardly to permit the leads to pass from the end-turns to the space surrounding the periphery of the stator-core and thence out through the hole in the frame-ring.

6. A dynamo-electric machine characterized by having a strong, rigid frame-ring, a stator-core comprising a rigidly held stack of stator-laminations with an end-plate at each end, said stack, including end-plates and stator-laminations, fitting, at a plurality of spaced points about the outer periphery of the stator-core, within the inside of the frame-ring, the end-plates and stator-laminations being spaced from the inside of the frame-ring at other peripheral points, at least one of the end-plates having a frame-ring-fitting part which extends around further circumferentially than the corresponding frame-ring-fitting part of the stator-laminations, the inner periphery of said end-plate being notched outwardly underneath said extended portion of the frame-ring-fitting part, a stator-winding carried by the stator-laminations, said stator-winding having end-turns, and a plurality of leads extending from the end-turns at the same end as said notched end-plate, said frame-ring having a hole whereby the leads may pass from the end-turns under the notch in the end-plate, over the notch in the stator-laminations, and thence through the hole in the frame-ring.

7. A dynamo-electric machine characterized by having a strong, rigid frame-ring, a stator-core comprising a rigidly held stack of stator-laminations with an end-plate at each end, said stack, including end-plates and stator-laminations, fitting, at a plurality of spaced points about the outer periphery of the stator core, within the inside of the frame-ring, the end-plates and stator-laminations being spaced from the inside of the frame-ring at other peripheral points, at least one of the end-plates having a frame-ring-fitting part which extends around further circumferentially than the corresponding frame-ring-fitting part of the stator-laminations, the inner periphery of said end-plate being notched outwardly underneath said extended portion of the frame-ring-fitting part, the outer periphery of at least the adjacent stator-laminations being notched at the place corresponding to the notch in the inner periphery of the notched end-plate, a stator-winding carried by the stator-laminations, said stator-winding having end-turns, and a plurality of leads extending from the end-turns at the same end as said notched end-plate, said frame-ring having a hole whereby the leads may pass from the end-turns under the notch in the end-plate, over the notch in the stator-laminations, and thence through the hole in the frame-ring.

LEON R. LUDWIG.
THEODORE C. FOCKLER.
WILLIAM H. FORMHALS.
HOWARD T. WALTON.

REFERENCES CITED

The following references are of record in the file of this patent:

UNITED STATES PATENTS

| Number | Name | Date |
|---|---|---|
| 716,278 | Reist | Dec. 16, 1902 |
| 1,858,261 | Barnholdt | May 17, 1932 |